May 20, 1930.  A. R. MILES  1,759,796
SAFETY VALVE FOR TIRES
Filed Sept. 1, 1926
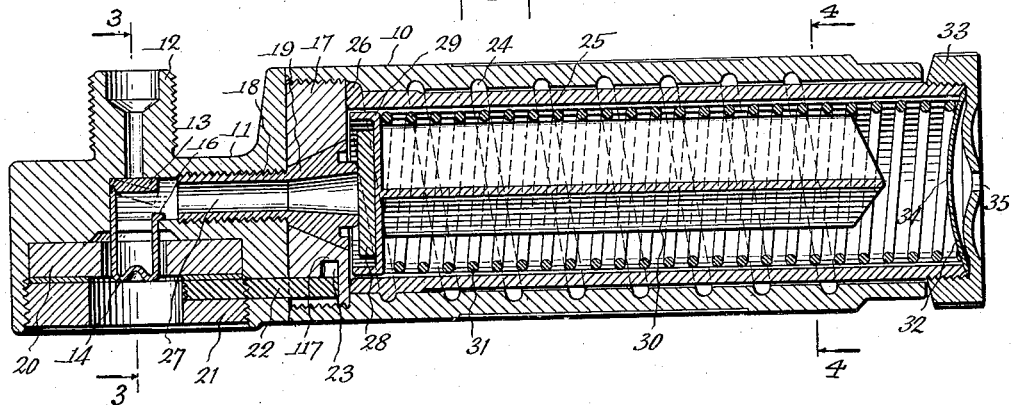
Fig.1.
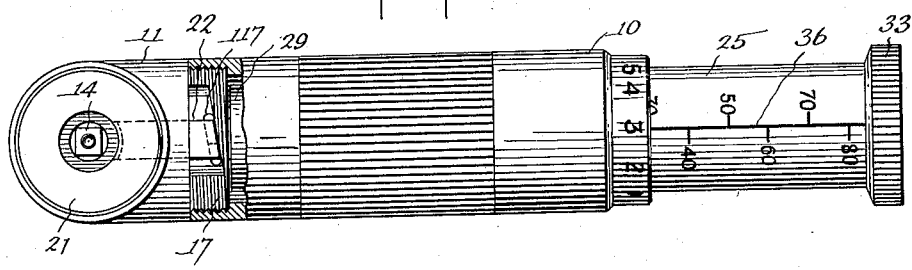
Fig.2.
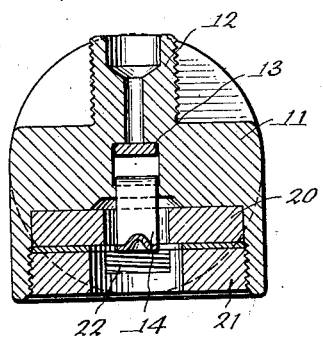
Fig.3.
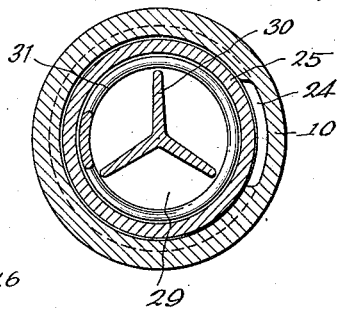
Fig.4.
Fig.5.
WITNESSES:
Fred B. Aebly.
J. D. McAuliffe
INVENTOR:
ALBERT R. MILES
BY Munn & Co.
ATTORNEYS.

Patented May 20, 1930

1,759,796

UNITED STATES PATENT OFFICE

ALBERT RAYMOND MILES, OF INDIANAPOLIS, INDIANA

SAFETY VALVE FOR TIRES

Application filed September 1, 1926. Serial No. 133,062.

My invention relates to a safety valve for tires, and particularly to a device of the class described whereby the inflation may be produced to any predetermined pressure within the limits of the gauge, and upon reaching the predetermined pressure which the gauge is set for an audible signal will be given and further inflation prevented, thus avoiding the danger of over-inflation.

The general object of my invention is to provide a device of the indicated class improved in various particulars whereby to promote accuracy and reliability in the use of the device, as well as simplicity of construction and convenience of adjustment and operation.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a longitudinal section of a safety valve for tires embodying my invention;

Figure 2 is a plan view with parts partly broken away and in section;

Figures 3 and 4 are transverse vertical sections on the lines 3—3 and 4—4 respectively, of Figure 1.

Figure 5 is a perspective view of the supporting device for the check valve.

In carrying out my invention in accordance with the illustrated example a tubular body or casing 10 is provided having a head 11 on the front end thereof, said head having a nipple 12 to receive a chuck or hose as in the case of a tire valve and the head and nipple having a passage therethrough for entrance of air to the tire valve or the like.

The air passage has a check valve 13 rockable on the support 14 having a V-shaped lug 15 on which the valve rests at one edge, said support also having a lateral member 16 to engage the head 11 on a side of the air passage. A threaded stem 18 engages the head 11 and has a conical end 19 fitting a corresponding bore in a plug 17 to hold head 11 permanently to the body 10. In the head 11 is a ring 20 and a second ring 21, through which the air passes. A latch 22 is provided passing through the ring 21 to prevent it from turning and to discourage tampering with the device. Said latch 22 has a lug 23 in the cam slot 117 in plug 17, so that the partial turning of body 10 and with it plug 17 will advance or retract latch 22. Said latch has a threaded end to engage the threads of the tire valve to hold the device firmly in position.

The hollow body 10 or casing has an internal thread 24, and a tubular shell 25 extending into the body 10 has a thread member 26 engaging the thread 24. The stem 18 on conical member 19 has a through bore for the release of air, said through bore being controlled by the valve 28 in a cup 29 having a stem 30 advantageously formed with radial, elongated wings. Spring 31 is coiled about stem 30 and bears at one end against cup 29, the opposite end of said spring bearing against a suitable abutment, there being shown for the purpose a disc 32 held in place by a milled cap 33 on shell 25. By turning the shell 25 back or forth the tension of the spring 31 is regulated.

On the rear end of body 10 of the outer surface is a transverse series of indicating numerals and on the shell 25 is a longitudinal indicating line 36, at opposite sides of which in staggered relation are numerals, as, for example, 10, 20, 30, 40, 50, 60, 70 and 80. With the turning of the shell 25 in a direction to cause it to move outwardly or inwardly, the line 36 may be given a position alining with any of the numerals on the body 10. The pressure, dependent on the tension of the spring 31, will be indicated by the numerals referred to, those numerals at the sides of line 36 being in practice added to that numeral on the body 10 with which said line 36 is in alinement to indicate the pressure. The released air escaping through holes 34—35 will give a whistling sound, as the disc 32 and cap 33 constitute a whistle.

The described construction serves to insure a predetermined pressure in a tire and it is unfailing in its operation to signal when the predetermined pressure has been reached.

The pressure may be released from the tire by applying the device to the tire valve, the air escaping through bore 27, shell 25 and through registering holes 34, 35 in disc 32 and cap 33.

It is to be understood that to release the pressure from the tire, the shell 25 is to be turned to move it outward to such a position that the pressure exerted by the spring on the valve is less than the pressure in the tire, when the valve will be opened and the air escape as above described.

I would state furthermore that while the illustrated example constitutes a practical embodiment of my invention, I do not limit myself strictly to the exact details herein illustrated, since manifestly, the same can be considerably varied without departure from the spirit of the invention, as defined in the appended claims.

What I claim is:

1. A device of the class described including a tubular body, having a bore for the release of air, a valve at the forward end of the bore controlling the same, a shell within said body and disposed at its forward end about said valve, said valve having a stem disposed longitudinally in said shell, said shell affording a passage longitudinally through the body for the air, the rear end of the shell affording an outlet for the air, a spring within the shell and surrounding said stem, said spring exerting pressure against said valve to maintain it closed, the inner end of said body having a thread of large pitch, and the said shell having a member engaging the thread of the body so that the turning of the shell within the body varies the pressure of said spring against said valve.

2. In a device of the class described, including a tubular body having a removable head, a threaded hollow stem passing through said head and forming a bore for release of air, said stem having a conical inner end adapted to constitute a valve seat, a shell in said body having threaded connection therewith, a plug within said body abutting one end of said inner shell when inner shell is at innermost position, said plug having a conical seat to receive said conical stem end, a valve controlling said hollow stem, and spring means exerting pressure on said valve, said shell affording an abutment for one end of the spring and adapted to vary the tension of the spring for relative turning of the body and shell.

3. In a device of the class described, a body having at its forward end a reduced bore and provided on its inner face with a thread of large pitch, a shell in the body and having at its inner end a member projecting therefrom and engaging the thread of the body, said shell having a disk and cap at its outer end, the disk and cap being apertured, and a valve in the shell for closing the bore of the body, said valve comprising a valve member, a cup in which the valve member is mounted and of less diameter than the shell, said cup having a stem being provided with radial wings, and a spring surrounding the stem and having one end engaging the cup and the other with the said disk.

ALBERT RAYMOND MILES.